(12) United States Patent
Kayama et al.

(10) Patent No.: US 7,741,940 B2
(45) Date of Patent: Jun. 22, 2010

(54) ACTUATOR DEVICE FOR OPTICAL DEVICE AND IMAGE-CAPTURE APPARATUS

(75) Inventors: Shun Kayama, Saitama (JP); Yukiko Shimizu, Saitama (JP); Masayuki Sugasawa, Saitama (JP); Atsushi Takano, Kanagawa (JP); Kunioki Takahashi, Chiba (JP); Kenji Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 11/889,564

(22) Filed: Aug. 14, 2007

(65) Prior Publication Data

US 2008/0055027 A1 Mar. 6, 2008

(30) Foreign Application Priority Data

Aug. 29, 2006 (JP) ............................. 2006-232840

(51) Int. Cl.
*H01F 7/08* (2006.01)
*G03B 9/08* (2006.01)

(52) U.S. Cl. ...................................... 335/222; 396/463
(58) Field of Classification Search ................. 335/222; 396/463
See application file for complete search history.

(56) References Cited

U.S. PATENT DOCUMENTS

| 4,702,583 | A | * | 10/1987 | Yoshino et al. | 396/132 |
|---|---|---|---|---|---|
| 5,430,519 | A | * | 7/1995 | Shimada et al. | 396/505 |
| 5,489,959 | A | * | 2/1996 | Akada | 396/508 |
| 5,602,610 | A | * | 2/1997 | Akimoto et al. | 396/449 |
| 5,689,746 | A | * | 11/1997 | Akada et al. | 396/508 |
| 5,705,873 | A | * | 1/1998 | Sato | 310/193 |
| 6,443,635 | B1 | * | 9/2002 | Matsumoto et al. | 396/463 |
| 6,473,217 | B2 | * | 10/2002 | Imano | 359/227 |
| 6,705,776 | B2 | * | 3/2004 | Watanabe | 396/463 |
| 6,733,192 | B2 | * | 5/2004 | Watanabe | 396/463 |
| 6,796,729 | B2 | * | 9/2004 | Mizukami et al. | 396/497 |
| 7,053,514 | B2 | * | 5/2006 | Kayama et al. | 310/156.26 |
| 2005/0174009 | A1 | * | 8/2005 | Kayama et al. | 310/216 |

FOREIGN PATENT DOCUMENTS

JP 2004-194403 7/2004

\* cited by examiner

*Primary Examiner*—Elvin G Enad
*Assistant Examiner*—Alexander Talpalatskiy
(74) *Attorney, Agent, or Firm*—Rader, Fishman & Grauer PLLC (57) ABSTRACT

Disclosed is an actuator device for an optical device. The actuator device includes a core arranged in an optical device inside of which an optical path passes through, a coil wound around the core, and a rotational magnet formed into an approximately cylindrical shape, at least one end of which includes a bearing portion in an axial direction, and which rotates according to a direction of a magnet field output from the core by electrifying the coil. The actuator device further includes a drive pin rotated in association with the rotational magnet, a base member securely supporting the core and rotatably supporting the rotating magnet, and an optical member moving in and out of the optical path based on rotation of the rotational magnet.

6 Claims, 10 Drawing Sheets

ACTUATOR DEVICE FOR OPTICAL DEVICE AND IMAGE-CAPTURE APPARATUS

CROSS REFERENCES TO RELATED APPLICATIONS

The present invention contains subject matter related to Japanese Patent Application JP 2006-232840 filed in the Japanese Patent Office on Aug. 29, 2006, the entire contents of which being incorporated herein by reference.

BACKGROUND OF THE INVENTION

1. Field of the Invention

The present invention relates to an actuator device for an optical device that moves an optical member in and out of an optical path using magnetic force, and also to an image-capture apparatus including such an actuator device.

2. Description of the Related Art

An actuator device for an optical device in related art is disclosed in Japanese Unexamined Patent Publication NO. 2004-194403. In Japanese Unexamined Patent Publication NO. 2004-194403, an electro-magnetic actuator configured to generate drive force from electro-magnetic force. Specifically, the electro-magnetic actuator is applied at the time of driving a shutter blade of camera, and the like, and a camera shutter device that employs the electro-magnetic actuator. The electro-magnetic actuator described in Japanese Unexamined Patent Publication NO. 2004-194403 is configured as follows. "This electro-magnetic actuator includes a rotor having an outer circumference divided in a circumferential direction such that each divided portion is polarized into alternately different magnetic polarity and having a drive pin formed in a manner protruding from the above-described outer circumference, an exciting coil, and a yoke having a circular arc surface facing the outer circumference of the above-described rotor and having a first magnetic polarity portion and a second magnetic polarity portion in which mutually different magnetic polarities are generated by allowing to flow electric current in the above-described coil". "In this electro-magnetic actuator, the drive force is output from the above-described drive pin by rotating in a prescribed angle range, and the above-described rotor is protruded from the above-described outer circumference to the outside in a radial direction and is polarized into the same magnetic polarity as this outer circumference, and in addition this rotor has projection portions formed in a manner being opposable to the above-described first magnetic polarity portion and the above-described second magnetic polarity portion".

According to the electro-magnetic actuator having such configuration that is described in Japanese Unexamined Patent Publication NO. 2004-194403, "a surface facing the yoke increases as the whole of rotor since the projection portion is provided which is protruded from the outer circumference of the rotor to the outside in the radius direction while being polarized into the same magnetic polarity as this outer circumference and that is formed in a manner being opposable to the first magnetic polarity portion and second magnetic polarity portion of the yoke". As a result, there can be expected such an effect "that the electro-magnetic actuator capable of generating desired retaining force and drive torque can be provided while reducing a size of the actuator.

An actuator device using a magnetic force of a magnet has been provided to move an optical member such as a shutter and a fixed diaphragm in an optical device. A plastic magnet having a magnetic powder mixed into plastic, for example, is generally used as the magnet for this actuator device. Since the plastic is used as a major component, this plastic magnet is excellent in formability, however, the generated magnetic force is weak.

Accordingly, a diameter of the plastic magnet may be increased to increase the magnetic force to a prescribed value in the optical device of related art. As a result, the whole optical device increases in size and hence an image-capture apparatus having such optical device also increases in size.

In contrast, a permanent magnet having a neodymium compound and a samarium compound, capable of generating a strong magnetic force, with the magnet being small in size has recently been developed and used.

In this case, the permanent magnet having the neodymium compound and the samarium compound is formed by sintering. Thus, it is preferable that the sintered permanent magnet be formed into a simple shape in view of formability. The simple shape, in this case, implies a cylindrical column since the cylindrical column can easily be manufactured comparatively by sintering.

SUMMARY OF THE INVENTION

The generated magnetic force may be weak since the plastic magnet is employed as the material of the permanent magnet in the actuator device for the optical device of related art, and thus, the large-size magnet needs to be used to generate the prescribed magnetic force. Accordingly, there has been such a problem that not only the magnet used in the actuator device becomes large but also the optical device using such magnet becomes large and thereby the image-capture apparatus using such optical device becomes also large.

An actuator device for an optical device according to an embodiment of the present invention includes a core arranged in an optical device inside of which an optical path passes through, a coil wound around the core, a rotational magnet rotating in a direction corresponding to a direction of a magnetic field output from the core by allowing to flow electric current in this coil, a drive pin that rotates integrally with this rotational magnet, and a base member that securely supports the core and at the same time rotatably supports the rotational magnet. The actuator device moves an optical member in and out of the above-described optical path by rotating of the drive pin that rotates based on the rotating of the rotational magnet. In the actuator device, the rotational magnet is formed into an approximately cylindrical column shape and a bearing portion is provided on at least one end of the rotational magnet in an axial direction.

An image-capture apparatus according to an embodiment of the present invention includes an image capture element attached to a lens barrel, a photographic optical system supported in the inside of the lens barrel and that leads an image form a subject to the above-described image capture element, and an actuator device moving a optical member in and out of an optical path of this photographic optical system. The actuator device for the image-capture apparatus includes a core inside of which the optical path is passes through, a coil wound around the core, a rotational magnet rotating in a direction corresponding to a direction of a magnetic field output from the core by allowing to flow the electric current in the coil, a drive pin rotating integrally with the rotational magnet, and a base member securely supporting the core and simultaneously rotatably supporting the rotational magnet. Further, the rotational magnet is formed into an approximately cylindrical column shape and a bearing portion is provided in at least one end of an axial direction of this rotational magnet such that the optical member is put in and out of the optical path by the rotating of the drive pin that rotates based on the rotating of the rotational magnet.

According to the actuator device for the optical device and the image-capture apparatus in the embodiment of the present invention, the rotational magnet of the actuator device can be manufactured in a relatively easily manner. Especially, the actuator device having the rotational magnet capable of generating strong magnetic force with small size can be obtained using a neodymium compound or a samarium compound as a major component of the rotational magnet. As a result, the whole optical device having the actuator device may be reduced in size. Further, the image-capture apparatus having the optical device can reduced in size and weight.

DESCRIPTION OF THE PREFERRED EMBODIMENTS

An actuator device for an optical device and an image-capture apparatus that can reduce in size and weight of the whole apparatus by forming a rotational magnet into an approximately cylindrical column shape, and providing a bearing portion in at least one end of the rotational magnet in an axial direction so that large magnetic force can be generated by the small rotational magnet.

Figure 1:
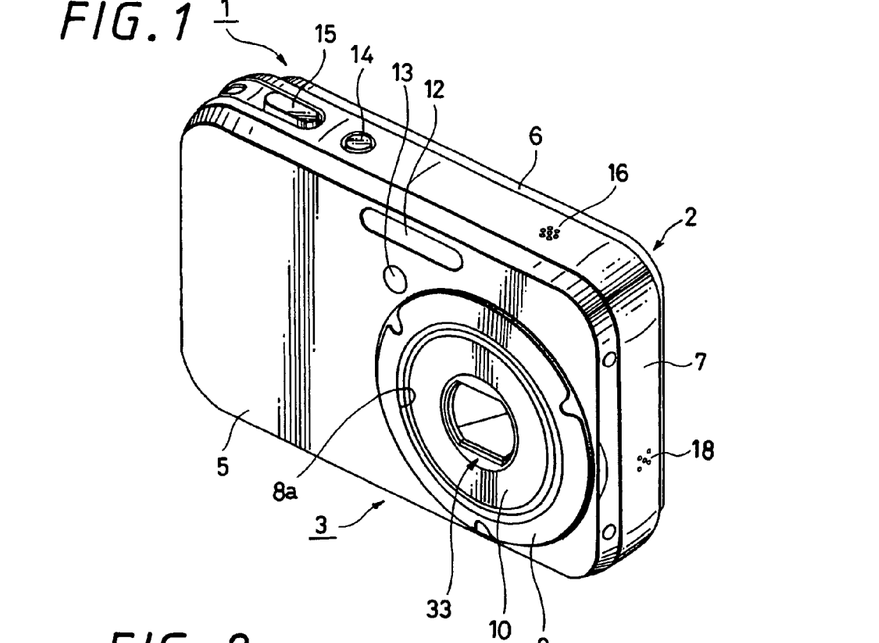
FIG. 1 is a perspective view of a retracted state of a lens barrel of a digital still camera illustrating a first embodiment of an image-capture apparatus according to the present invention.
Figure 2:
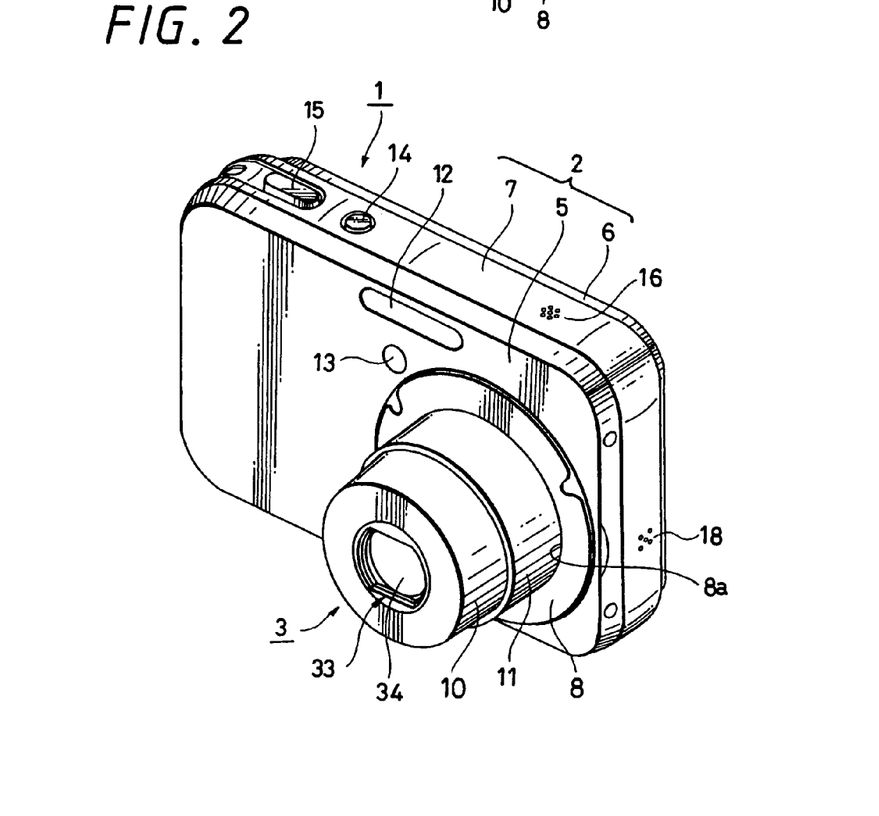
FIG. 2 is a perspective view of a protruded state of a lens barrel of the digital still camera illustrating the first embodiment of the image-capture apparatus according to the present invention.
Figure 3:
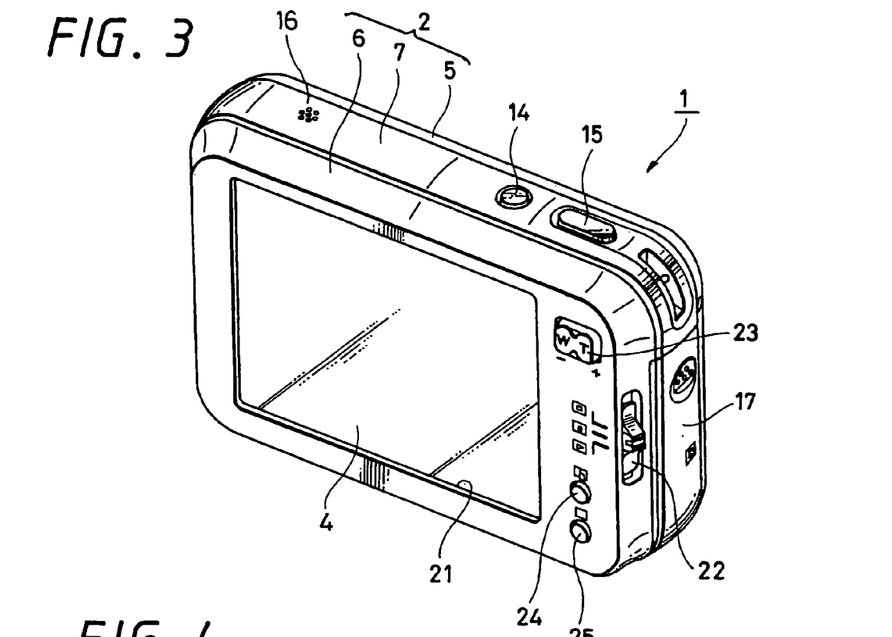
FIG. 3 is a perspective view showing a rear view of the digital still camera illustrating the first embodiment of the image-capture apparatus according to the present invention.
Figure 4:
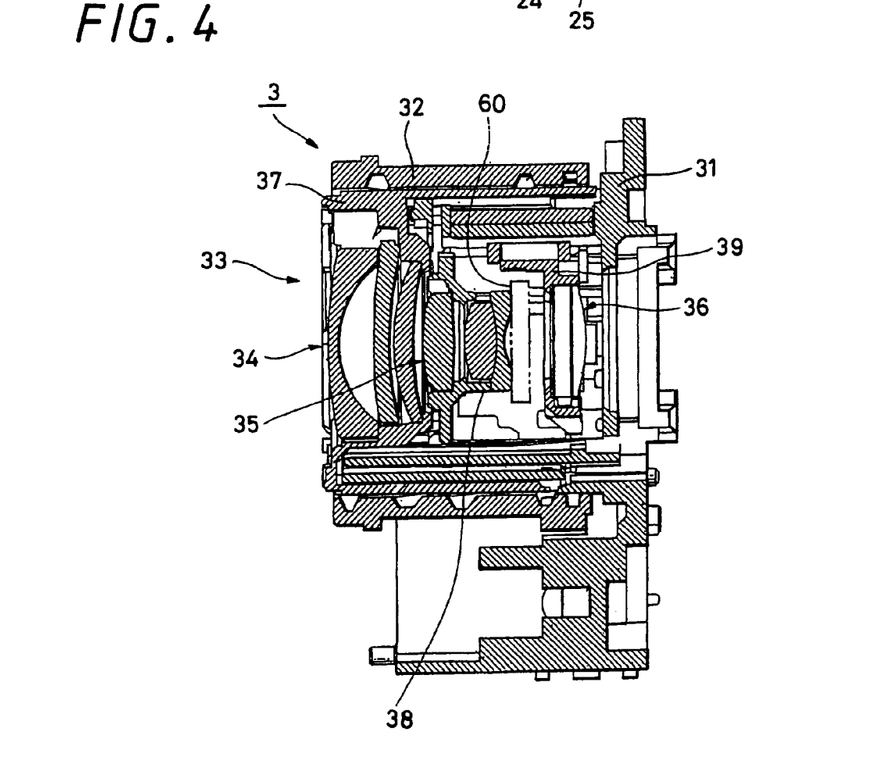
FIG. 4 is a diagram showing a vertical cross-section of a lens barrel that is suitable for use in the digital still camera illustrating the first embodiment of the image-capture apparatus according to the present invention.
Figure 5:
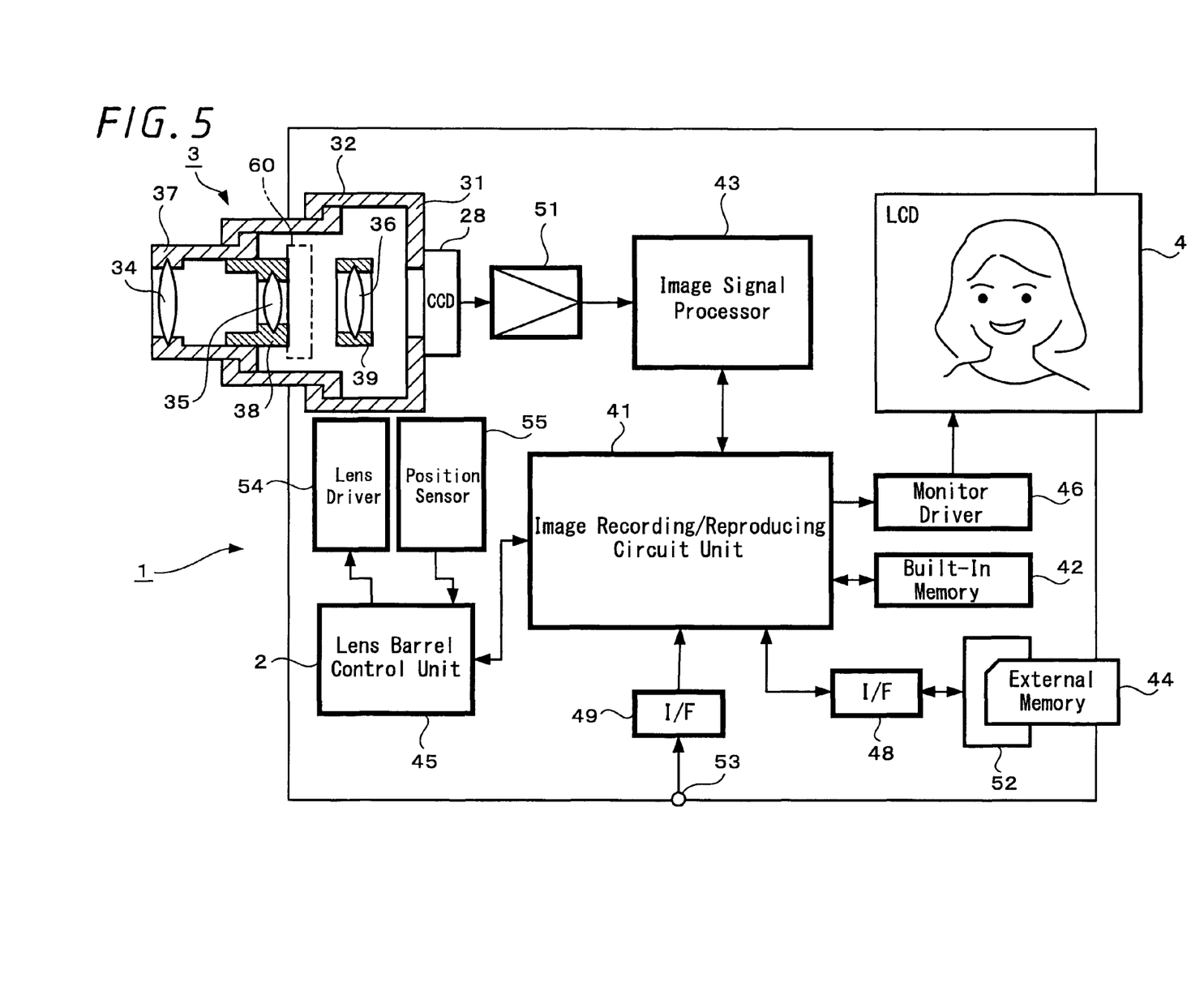
FIG. 5 is an explanatory block diagram showing an outlined configuration of the digital still camera illustrating the first embodiment of the image-capture apparatus according to the present invention.
Figure 6:
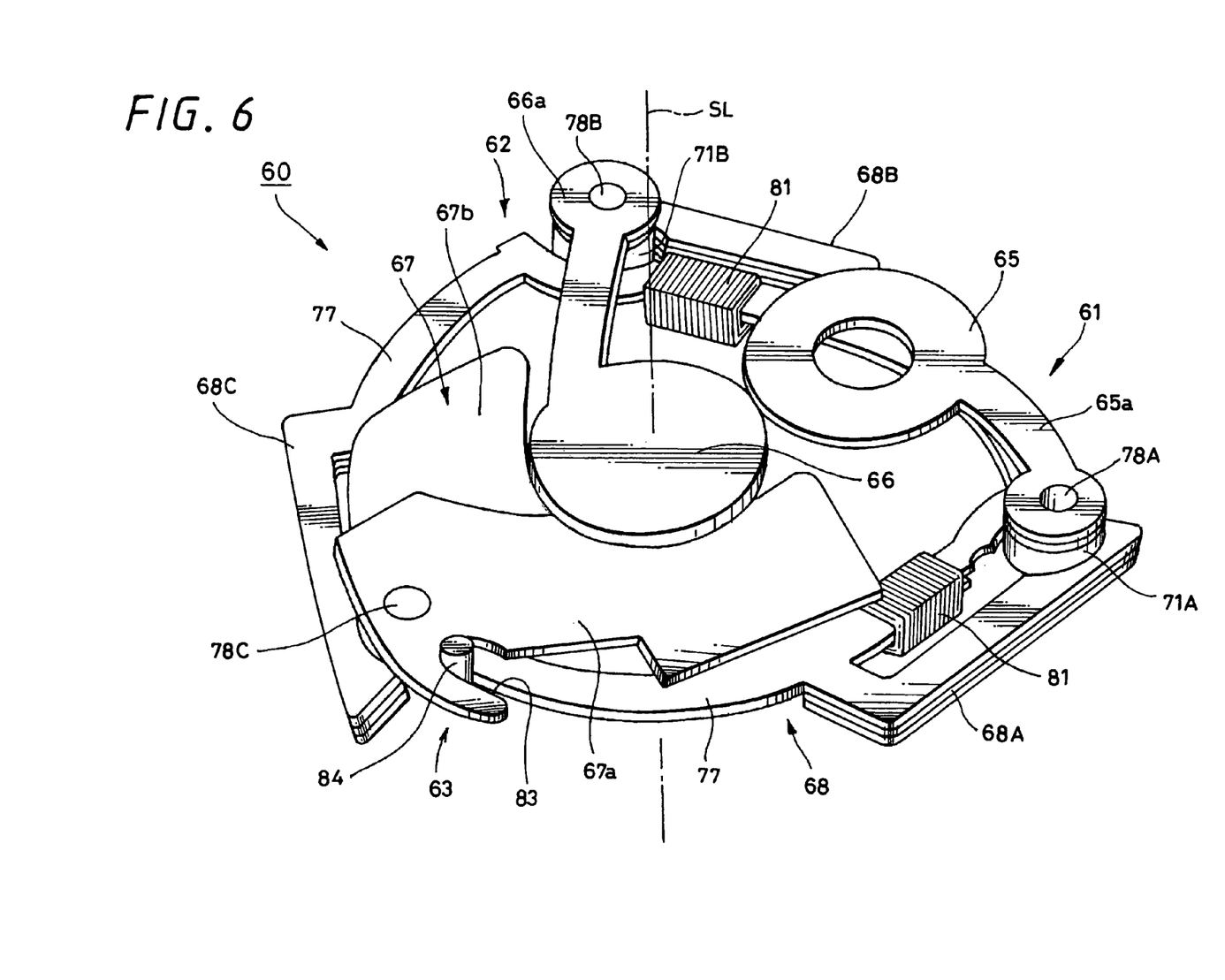
FIG. 6 is a perspective view showing a first embodiment of an actuator device according to the present invention.
Figure 7:
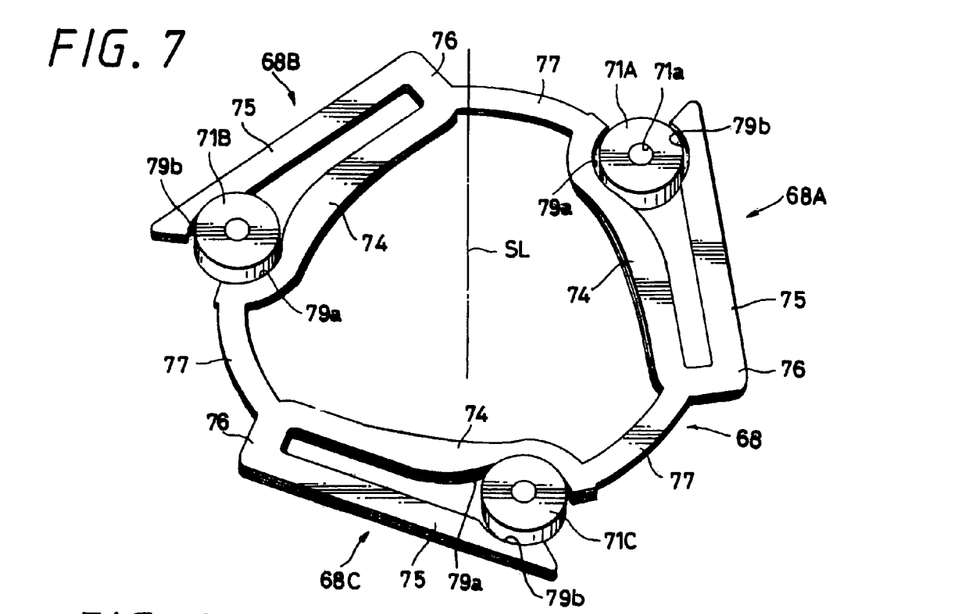
FIG. 7 is a diagram showing the first embodiment of the actuator device according to the present invention, which is an explanatory diagram showing a state in which a rotational magnet is disposed in a core body.
Figure 8:
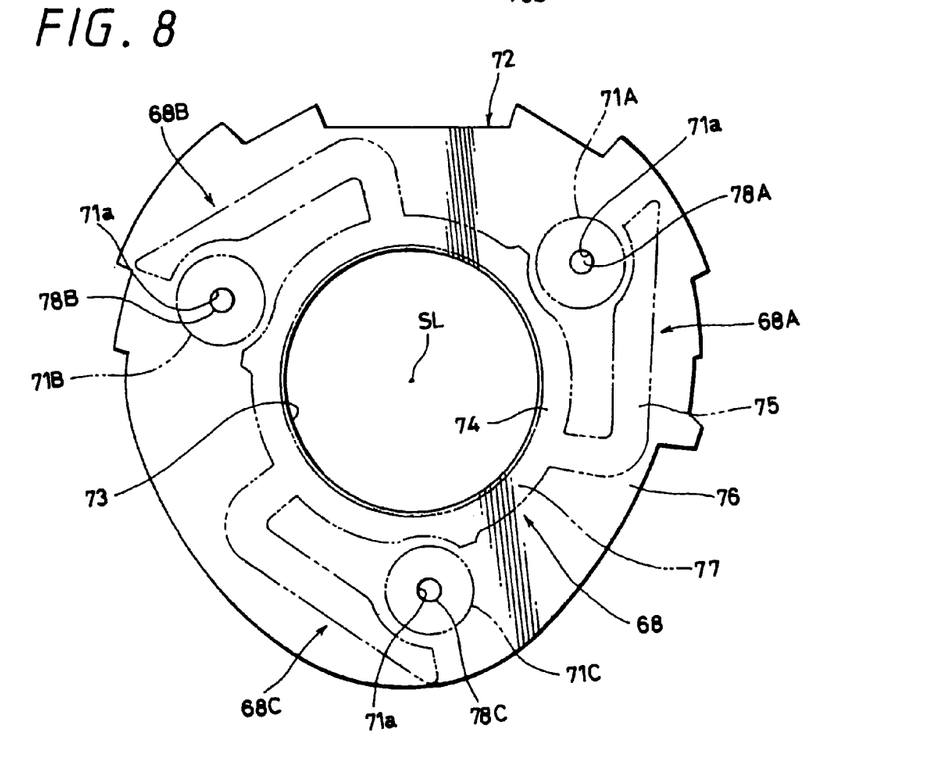
FIG. 8 is a diagram showing the first embodiment of the actuator device according to the present invention, which is a plan view showing a base member of the actuator device.
Figure 9:
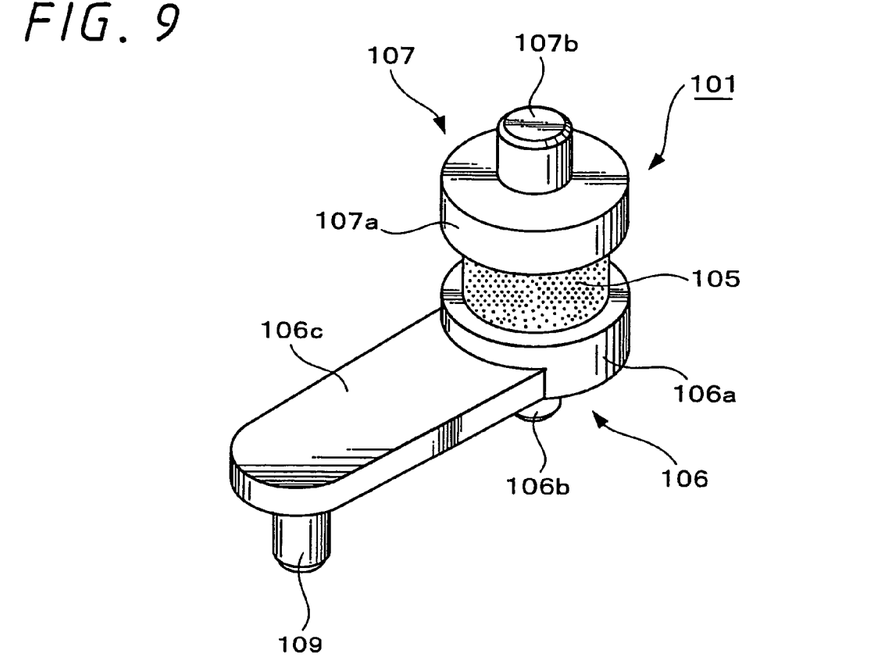
FIG. 9 is a perspective view showing a first embodiment of the rotational magnet related to the first embodiment of the actuator device according to the present invention.
Figure 10:
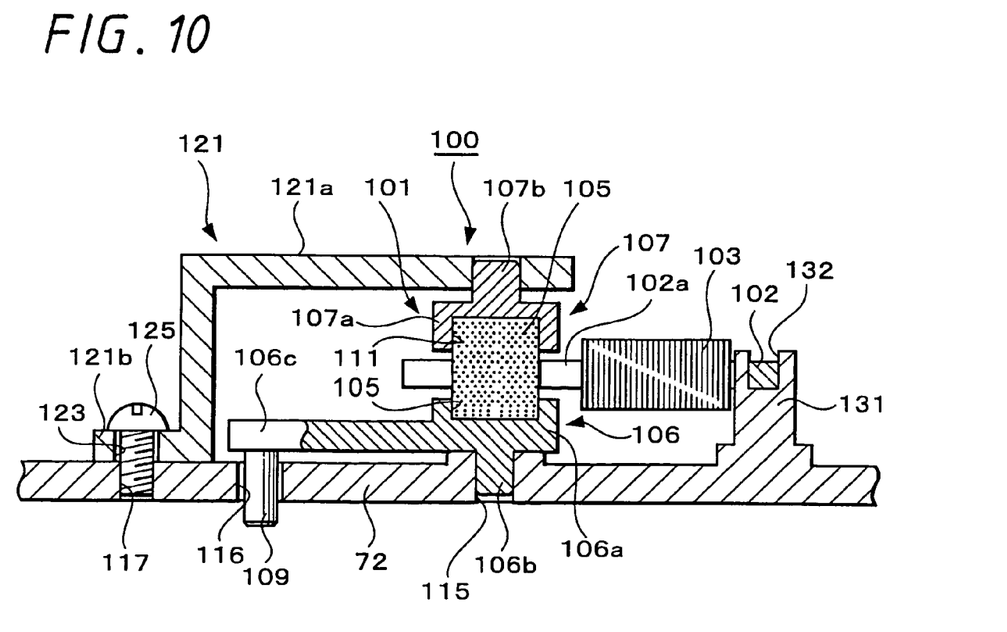
FIG. 10 is a cross-sectional view of the actuator device illustrating the first embodiment of the actuator device according to the present invention.
Figure 11:
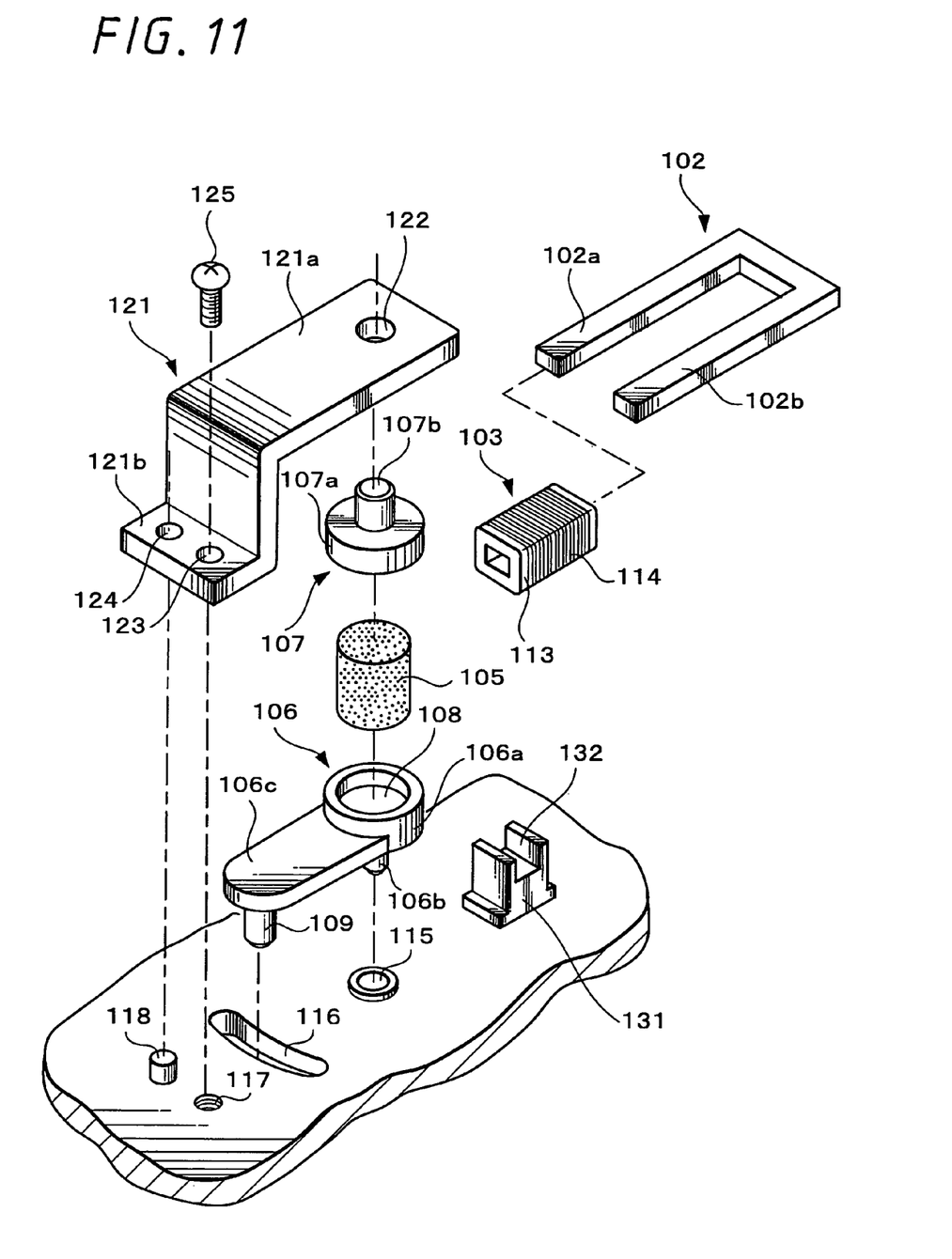
FIG. 11 an exploded perspective view of the actuator device illustrating the first embodiment of the actuator device according to the present invention.
Figure 12:
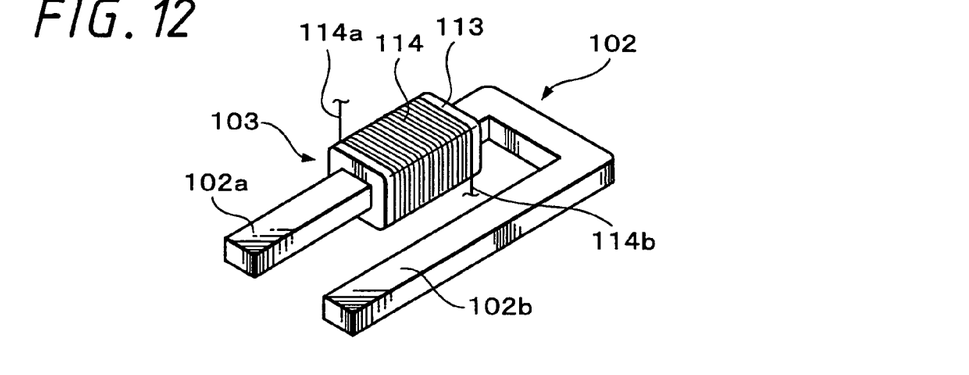
FIG. 12 is a perspective view showing a core and a coil related to the first embodiment of the actuator device according to the present invention.
Figure 13:
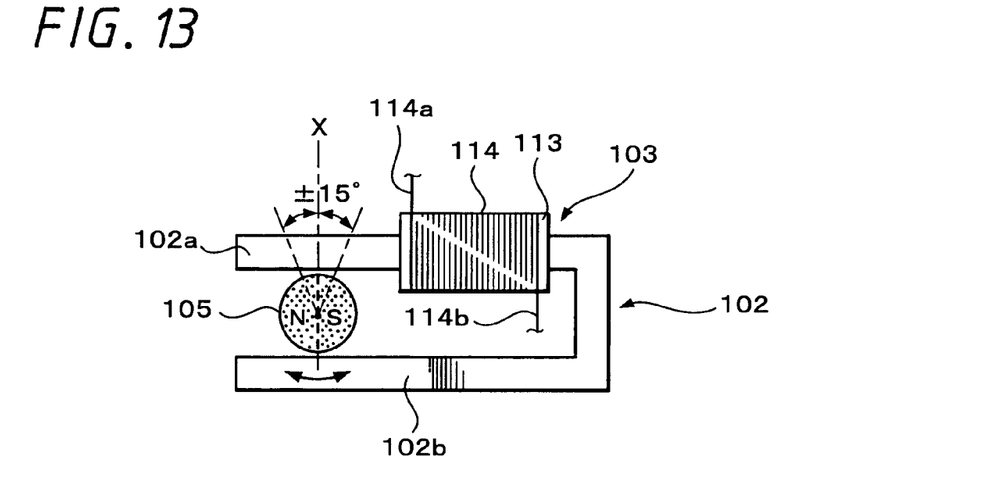
FIG. 13 is a plan view showing the core and the coil related to the first embodiment of the actuator device according to the present invention.
Figure 14:
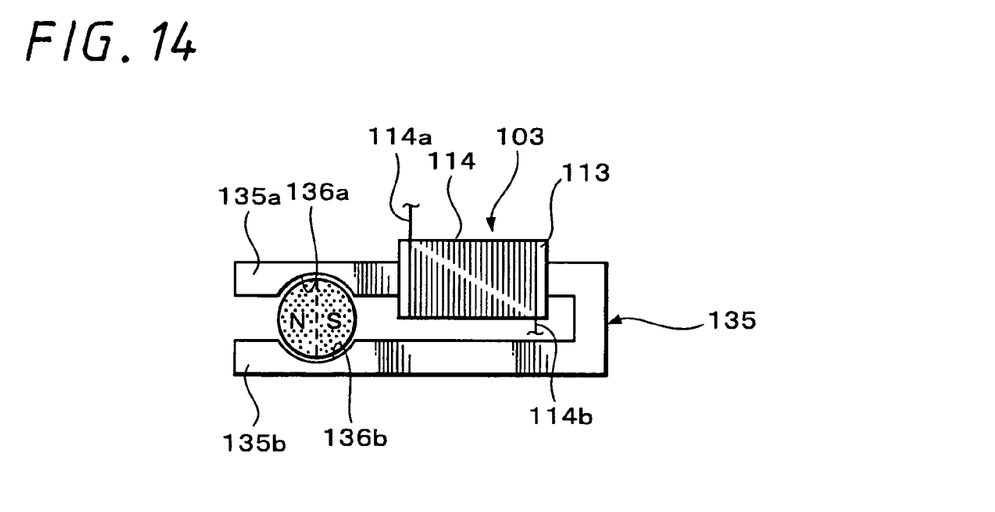
FIG. 14 is a plan view showing a core and a coil related to a second embodiment of an actuator device according to the present invention.
Figure 15:
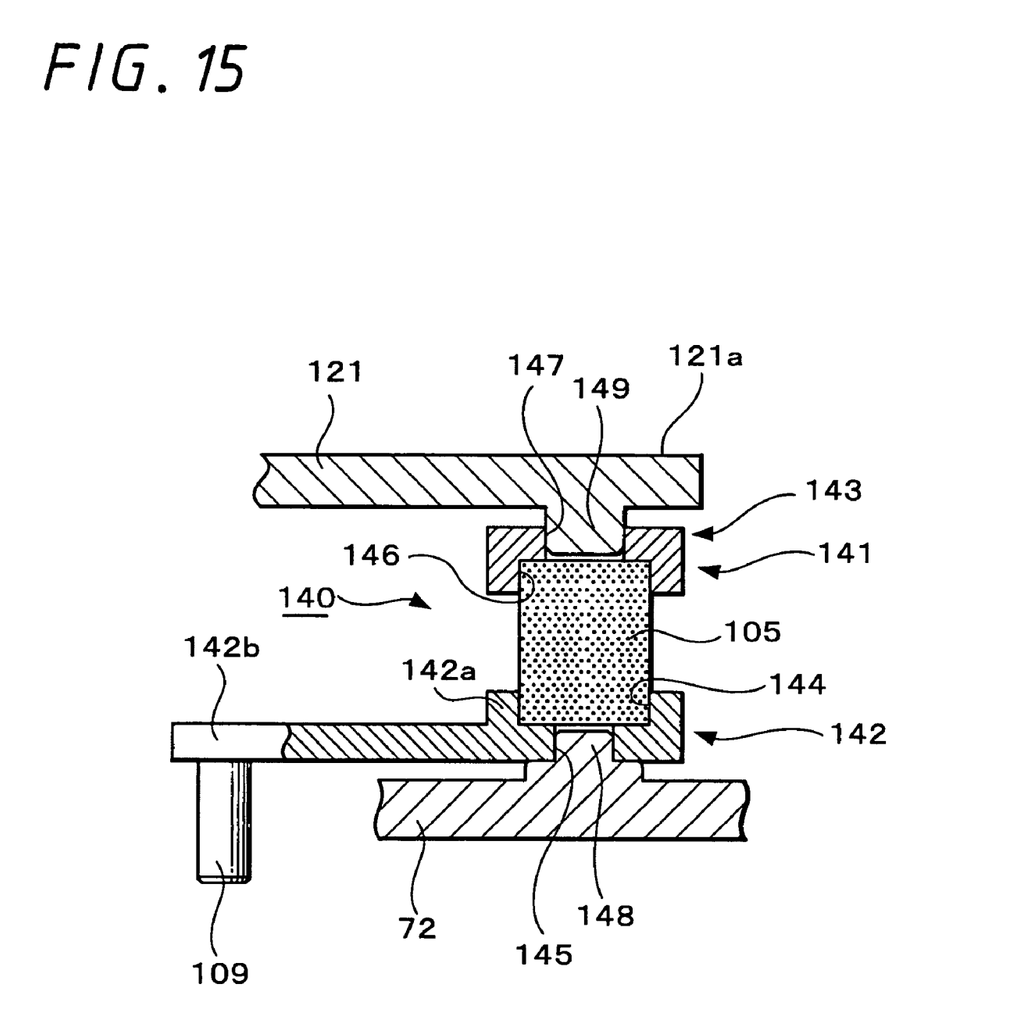
FIG. 15 is a cross-sectional diagram showing a second embodiment of a rotational magnet related to the first embodiment of the actuator device according to the present invention.
Figure 16:
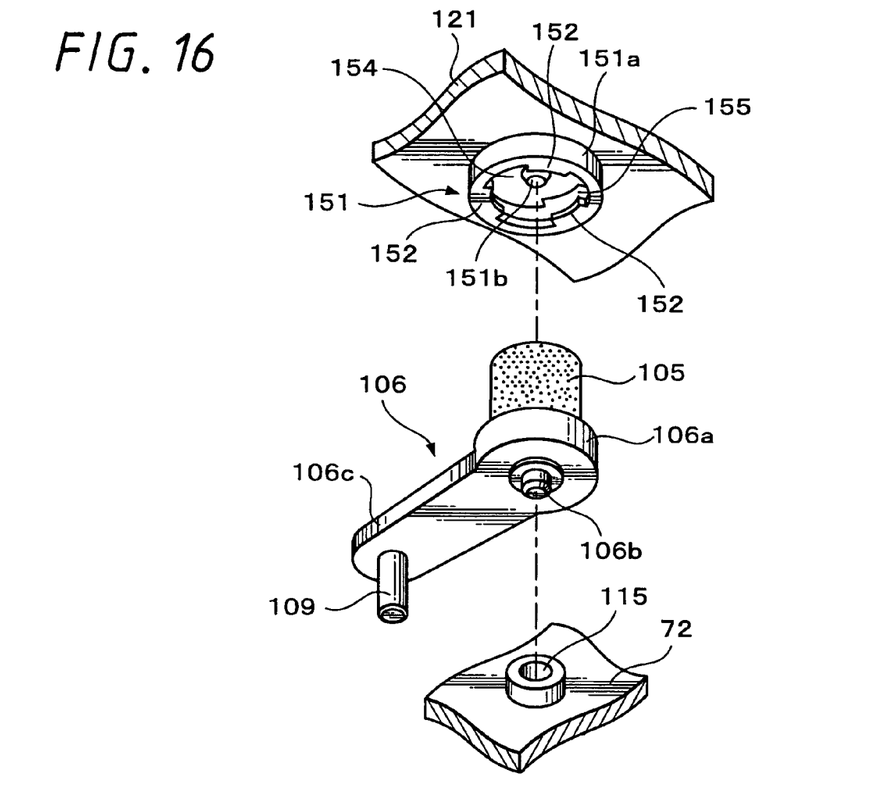
FIG. 16 is an exploded perspective view showing a third embodiment of a rotational magnet related to the first embodiment of the actuator device according to the present invention.
Figure 17:
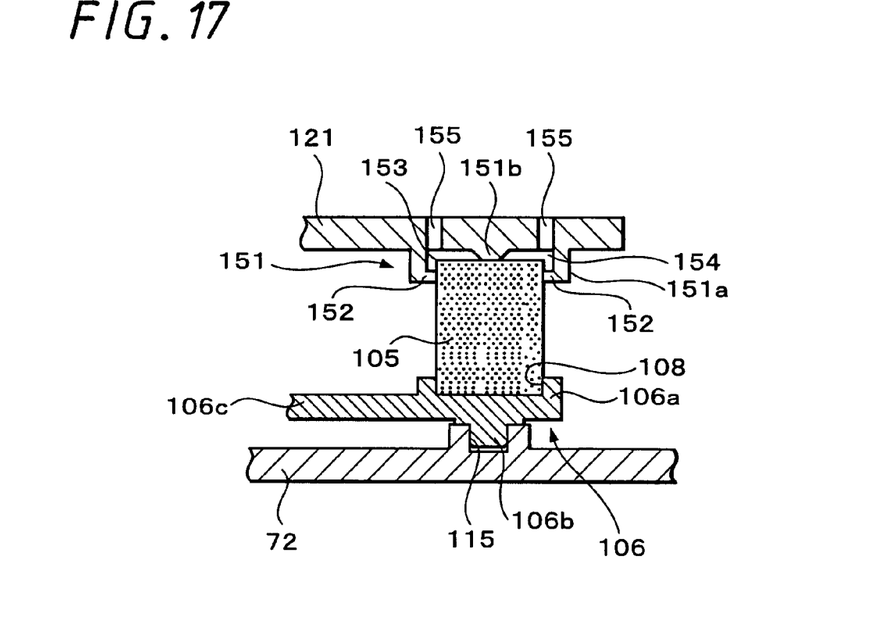
FIG. 17 is a cross-sectional view showing the third embodiment of the rotational magnet related to the first embodiment of the actuator device according to the present invention.

Hereinafter, preferred embodiments of the present invention are described with reference to the attached drawings. FIG. 1 to FIG. 17 are diagrams illustrating the embodiments of the present invention. Specifically, FIG. 1 is a perspective view of a retracted state of a lens barrel of a digital still camera illustrating a first embodiment of an image-capture apparatus according to the present invention; and FIG. 2 is a perspective view of a protruded state of a lens barrel illustrating the same. FIG. 3 is a rear view of the digital still camera. FIG. 4 is a diagram showing a vertical cross-section of the lens barrel. FIG. 5 is an explanatory block diagram showing an outlined configuration of the digital still camera. FIG. 6 is a perspective view showing a first embodiment of an actuator device according to the present invention. FIG. 7 is an explanatory diagram showing a state in which a rotational magnet is disposed in a core body. FIG. 8 is a plan view showing a base member of the actuator device. FIG. 9 is a perspective view showing a first embodiment of a rotational magnet. FIG. 10 is a cross-sectional view of the actuator device and FIG. 11 is an exploded perspective view showing the same. FIG. 12 is a perspective view showing a core and a coil. FIG. 13 is a plan view showing the core and the coil. FIG. 14 is a plan view showing a second embodiment of the core and coil. FIG. 15 is a cross-sectional view showing a second embodiment of the rotational magnet. FIG. 16 is an exploded perspective view showing a third embodiment of the rotational magnet and FIG. 17 is a cross-sectional view showing the same.

First, a digital still camera 1 used for an image-capture apparatus is described according to an embodiment of the present invention. The digital still camera 1 shown in FIG. 1 to FIG. 4 illustrates a first embodiment of the image-capture apparatus according to the present invention and includes a later-described actuator device of an optical system according to an embodiment of the present invention. The digital still camera 1 includes a semiconductor recording medium that is used as an information recording medium, and converts an optical image obtained by imaging a subject into an electrical signal using an image capture element, such as CCD and CMOS, to record the converted signal of the optical image on the semiconductor medium and display on a flat display panel 4 used as a display device, such as a liquid crystal display.

The digital still camera 1 includes a lens barrel 3 that captures light of the subject image into the image capture element, a camera case 2 that includes the lens barrel 3, other devices, and the like, the flat display panel 4 used as the display device including the liquid crystal display that displays an image based on an image signal output from the image capture element, a control device that controls operation of the lens barrel 3, display of the flat display panel 4 and the like, and a battery power source, and the like (not shown).

The camera case 2 includes an oblong flat container having a front case 5 and a rear case 6 that are mutually overlapped, a center case 7 with an approximately rectangular frame body that is interposed between the front case 5 and the rear case 6, and the like. A ring-shape facing ring 8 is fitted at a position slightly biased to one-side from the center of a front face of the front case 5, and one group ring and the like positioned on the front side of the lens barrel 3 are retractably fronting to a central hole 8a of the facing ring 8.

FIG. 1 is a diagram showing the lens barrel 3 when image-capturing operation is inactive (barrel retracted state). The lens barrel 3 is configured such that an approximately entire front face of the lens barrel 3 is approximately in the same plane with the front face of the front case 5. Further, FIG. 2 is a diagram showing the lens barrel 3 (barrel protruded state), in which a facing ring 10 enclosing the one group ring and a facing ring 11 enclosing a rectilinear ring are drawn out in a nested state.

A light-emitting unit 12 of a flush device and a light-emitting/light-sensitive unit 13 of an auto-focus mechanism are provided in a diagonally upper portion of the lens barrel 3 in the front case 5. In addition, a power button 14, a shutter button 15, a sound collection hole 16 for a sound collection device such as a microphone are provided in an upper face of the center case 7. Further, a battery housing unit, into which the battery used as a power source is detachably housed, is provided in one of the side faces of the center case 7, and a battery cover 17 is detachably fitted with the battery housing unit. Furthermore, a speaker hole 18 for a speaker device is provided in the side face opposite to the battery cover 17 of the center case 7.

A large opening of a display window 21 is provided in the rear case 6, and the flat display panel 4 is attached to the display window 21. The flat display panel 4 includes a touch operation function that can be operated by a user touching a display surface. Moreover, various operation switches are provided on one side of the flat display panel 4 of the rear case 6. Examples of the operation switches include a mode selection switch 22 configured to select a functional mode (such as still image, moving image, and reproduction), an optical zoom operation button 23 configured to execute a zoom operation, a menu button 24 configured to select various menus, a display switch button 25 configured to switch a screen display, and the like. In addition, a direction key configured to move a cursor for selecting the menu, and the like, a screen button configured to switch a screen size and delete the screen image, and the like can also be provided.

A control device configured to perform drive control on the lens barrel 3, the flat display panel 4, and the like are incorporated into the inside of the camera case 2 having such configuration. The control device is incorporated such that prescribed micro-computer, resistor, capacitor, other electronic parts and the like are mounted on a wiring substrate, for example.

FIG. 4 is an explanatory vertical cross-section of the lens barrel 3. The lens barrel 3 includes a fixing ring 31 that is secured on inside of the camera case 2, a movable ring 32 that is rotatably supported on the fixing ring 31, a photographic optical system 33 supported by the rings, and the like. An image capture element 28 including CCD, CMOS sensor, and the like to capture an image of subject focused by the photographic optical system 33 is provided on a rear portion of the lens barrel 3. Image data is generated based on a captured image signal that is output from the image capture element 28, and the generated image data is supplied to each unit of the digital still camera 1.

The photographic optical system 33 attached to the lens barrel 3 includes three-group lens having a first-group lens 34 formed of a plurality of lenses, a second-group lens 35 formed of a plurality of lenses, a third-group lens 36 formed of one or two or more lenses and a low-pass filter and the like (not shown). The three group lenses are arranged in the listed order from the subject. The first-group lens 34 is supported by a first-group lens frame 37, the second-group lens 35 is supported by a second-group lens frame 38, and the third-group lens 36 is supported by a third-group lens frame 39. Further, an actuator device 60 related to the embodiment of the present invention is attached to the second-group lens frame 38.

In the photographic optical system 33, a zooming operation of the optical system performed by moving the first-group lens 34 and the second-group lens 35 with a prescribed distance in a direction of optical axis. In addition, a focusing operation is performed by moving the third-group lens 36 with a prescribed distance in the direction of optical axis.

FIG. 5 is a block diagram showing an outlined configuration of the digital still camera 1 having the lens barrel 3 according to a first embodiment of the present invention. The digital still camera 1 includes the lens barrel 3, an image recording/reproducing circuit unit 41 that performs a major function of the control device, a built-in memory 42 having a program memory to drive the image recording/reproducing circuit unit 41, a data memory and other RAM, ROM, and the like, an image signal processor 43 to convert the captured image, and the like into a prescribed signal, the flat display panel 4 to display the captured image, and the like, an external memory 44 to expand memory capacity, a lens barrel control portion 45 to perform the drive control on the lens barrel 3, and the like.

The image recording/reproducing circuit unit 41 includes an arithmetic circuit having a micro-computer (CPU), for example. The built-in memory 42, the image signal processor 43, the lens barrel control portion 45, a monitor driver 46, an amplifier 47, and two interfaces (I/F) 48 and 49 are connected with the image recording/reproducing circuit unit 41. The image signal processor 43 is connected with the image capture element 28 attached to the lens barrel 3 through an amplifier 51. The signal converted into the prescribed image signal at the image signal processor 43 is input to the image recording/reproducing circuit unit 41.

The flat display panel 4 is connected with the image recording/reproducing circuit unit 41 through the monitor driver 46. A connector 52 is connected with the first interface (I/F) 48 so that the external memory 44 can be detachably connected with the connector 52. A connection terminal 53 provided in the camera case 2 is connected with the second interface (I/F). Further, a lens driver 54 configured to perform the drive control on the lens barrel 3 and a position sensor 55 configured to detect an amount of rotating movement of the lens barrel 3, an amount of movement of the lens barrel in the direction of optical axis, and the like are connected with the lens barrel control portion 45.

Thus, the image of the subject is input to the photographic optical system 33 of the lens barrel 3 and is focused on an imaging surface of the image capture element 28, and then the image signal generated therefrom is input to the image signal processor 43 through the amplifier 51. The signal that is converted into the prescribed image signal at the image signal processor 43 is input to the image recording/reproducing circuit unit 41. The signal corresponding to the image of the subject is output from the image recording/reproducing circuit unit 41 to the monitor driver 46 and to the built-in memory 42 or to external memory 44. As a result, the image corresponding to the image of the subject is displayed on the flat display panel 4 through the monitor driver 46, or the image is optionally recorded on the built-in memory 42 or external memory 44 as an information signal.

First, an outline of the actuator device 60 will be described, and thereafter detailed configuration and functions of the actuator device 60 are described. The actuator device 60 attached to the second-group lens frame 38 of the lens barrel 3 includes three actuators including a first actuator 61, a second actuator 62, and a third actuator 63 as shown in FIG. 6.

The three (first to third) actuators 61 to 63 are configured such that optical members move in and out of an optical path SL of the photographic optical system 33. In this embodiment, the first actuator 61 moves a fixed diaphragm 65 in and out of the optical path SL. The second actuator 62 moves an ND filter 66 in and out of the optical path SL. In addition, the third actuator 63 moves a shutter blade 67 in and out of the optical path SL. Amount of incident light in the optical path SL is adjusted by the fixed diaphragm 65 and the ND filter 66, and the optical path SL is opened and closed by operating the shutter blade 67.

The three (first to third) actuators of 61 to 63 are configured to include yokes 68A, 68B and 68C, coils 69, rotational magnets 71A, 71B, and 71C, respectively, a base member 72, and the like. The three yokes 68A, 68B, and 68C are formed with prescribed intervals in a circumferential direction and are integrated into one yoke body 68. As shown in FIG. 7, each of the three yokes 68A, 68B, and 68C has an inner portion 74 extending along a circumference of the optical path SL, an outer portion 75 that faces the inner portion 74 located at an outside position and has a more distance from the optical path SL than the inner portion 74, and a connecting portion 76 to connect the inner portion 74 and an end portion of the outer portion 75 on one side of an extending direction. Further, the mutually adjacent inner portion 74 and inner portion 74 are respectively coupled with a coupling portion 77.

Further, the three yokes 68A, 68B and 68C are configured such that one or two or more magnetized thin plate materials are stacked. The number of sheets of the thin plate material is determined depending on the optical member that rotates by each yoke such that the magnetic force is generated with sufficient intensity to move each optical member in and out of the optical path SL. A silicon steel plate, an electromagnetic steel plate, a pure iron plate, a steel plate and the like can be used as the material of the yoke 68, for example. The yoke body 68 is attached to the base member 72 as shown in FIG. 8. The base member 72 is formed as a ring-shaped member having a round hole 73 through the center of which light passes. Three spindles 78A, 78B, and 78C are provided in the base member 72 such that the spindles are provided at equal intervals in the circumferential direction around the round hole 73.

Three rotational magnets 71 are rotatably fitted with the three spindles 78A, 78B and 78C, respectively. Each of the three rotational magnets 71A, 71B and 71C is disposed on the end portions between the inner portion 74 and the outer portion 75 on the opposite side of each connecting portion 76 of the three yokes 68A, 68B and 68C. Each of the rotational magnets 71A, 71B and 71C is formed into a cylindrical shape the center of which a bearing hole 71a passes through. Each of the rotational magnets 71A, 71B and 71C is polarized into N-polarity and S-polarity in a manner dividing into two portions in a diametrical direction and is configured such that the rotational magnet rotates at a prescribed angle complied with the polarity of the inner portion 74 and outer portion 75. Further, in order to expand an area facing each outer circumference of the rotational magnets 71A, 71B and 71C, a concave-shaped curved surface 79a is provided on each of the inner portions 74, and a concave-shaped curved surface 79b is provided on each of the outer portions 75.

In addition, a coil 81 is provided to each of the inner portions 74 of the three yokes 68A, 68B and 68C. The coil 81 is provided to each of the outer portions 75 of the yokes 68A, 68B and 68C. The coil 81 may include wire wound around a bobbin, and may include wire directly wound without having the bobbin which is attached using adhesives, and the like. A switching operation configured to change such that the inner portion 74 is changed into + (plus) polarity and the outer portion 75 is changed into − (minus) polarity. In contrast, the inner portion 74 can be changed into the minus polarity and the outer portion 75 can be changed into the plus polarity by switching a direction of the electric current that is allowed to flow in the coil 81.

Of the three rotational magnets 71A, 71B and 71C that are rotatably supported by the three spindles 78A, 78B and 78C, one end of an arm portion 65a of the fixed diaphragm 65 is secured on the first rotational magnet 71A that faces the first yoke 68A. The fixed diaphragm 65 can selectively be moved to a first position corresponding to the center of the optical path SL and to a second position externally deviated from the optical path SL in a radius direction by rotating the first rotational magnet 71A. One end of an arm portion 66a of the ND filter 66 is secured on the second rotational magnet 71B that faces the second yoke 68B. The ND filter 66 can selectively be moved to the first position corresponding to the center of the optical path SL and to the second position externally deviated from the optical path SL in the radius direction by rotating the second rotational magnet 71B.

In addition, one end of the shutter blade 67 is secured on the third rotational magnet 71C that faces the third yoke 68C. The shutter blade 67 includes two blade bodies 67a and 67b which are capable of opening and closing the optical path SL, and are rotatably supported by the third spindle 78C. A cam groove 83 is provided for each of the blade bodies 67a and 67b such that a cam pin 84 is slidably fitted with each cam groove 83. The cam pin 84 is moved by a blade opening-closing mechanism which is not illustrated, and the shutter blade 67 can selectively be moved to a first position to close the optical path SL by approaching the two blade bodies 67a and 67b, or move to a second position to open the optical path SL by departing the two blade bodies 67a and 67b.

Next, details of the actuator device are described with reference to FIG. 9 to FIG. 17. FIG. 9 to FIG. 12 are diagrams showing a first embodiment of the actuator device according to the present invention. An actuator device 100 of this embodiment includes a rotational magnet 101, a core 102, a coil 103 and the like.

The rotational magnet 101 has a magnet 105 that is formed into a cylindrical shape, a first shaft member 106 that is secured on one end of the magnet 105a in the axial direction, and a second shaft member 107 that is secured on the other end of the axial direction of the magnet 105 as shown in FIG. 9 to FIG. 11. The magnet 105 includes a solid-core shaft body having a circular cross-sectional shape, which is formed by sintering process. Preferable examples of the materials for the magnet (sintering magnet) 105 include a neodymium compound in which iron and the like are added to neodymium used as a major component, and a samarium compound in which cobalt and the like are added to samarium used as a major component.

The magnet 105 is polarized into two polarities of the N-polarity and S-polarity in a certain diametrical direction and is configured such that the magnet 105 can rotate at an angle of +/−15° against an X-axis that is to an extending direction of two core pieces 102a and 102b, for example, in FIG. 13. Further, the magnet 105 is configured such that this magnet is supported at an angle position of +15° or −15° without failure due to a magnetic spring generated between the magnet 105 and the core 102 when no electric current is applied. Furthermore, the magnet 105 is configured such that the magnet is rotatably displaced from an original position to an opposite position by changing + and − of a direction of electrifying the coil.

The first shaft member 106 is integrally secured on one end of the magnet 105 in the axial direction. The first shaft member 106 includes a cylindrical column portion 106a having a concave portion 108 with which one end of the magnet 105 is fitted in the axial direction, a first shaft portion 106b protruding in the axial direction from the center of the surface of the opposite side of the concave portion 108 of the cylindrical column portion 106a, and an arm portion 106c protruding from an outer circumference of the cylindrical column portion 106a in a lateral direction (radius direction) intersecting with the axial direction. Further, a drive pin 109 protruding in the same direction as the protruding direction of the first shaft portion 106b is provided on a surface of one end of the arm portion 106c from the side of which the first shaft portion 106b protrudes. The magnet 105 and the first shaft member 106 may be secured by press-fitting one end of the magnet 105 into the concave portion 108, and may also be secured such that the magnet and shaft member are bonded using adhesives.

The second shaft member 107 includes a cylindrical column portion 107a having a concave portion 111 with which the other end of the axial direction of the magnet 105 is engaged and a second shaft portion 107b protruding in the axial direction in the center of a surface located on the opposite side of the concave portion 111 of the cylindrical column portion 107a. The magnet 105 and the second shaft member 107 may be secured by press-fitting the other end of the magnet 105 into the concave portion 111, and may also be secured such that the magnet and shaft member are bonded using the adhesives. Engineering plastic such as ABS and PC may be suitable as a material of the first shaft member 106 and second shaft member 107.

The core 102 is formed into a flat-shape or U-shape, and two facing core pieces 102a and 102b are mutually extended in parallel. A silicon steel plate, an electromagnetic steel plate, a pure iron plate, a steel plate, and the like may be used as a material of the core 102, for example. The coil 103 is provided to the core piece 102a at one side of the core 102.

The coil 103 includes a bobbin 113 formed into a frame body having a rectangular cross-sectional shape and a coil wire 114 wound around the bobbin 113 by the prescribed number of windings. As shown in FIG. 12, the core piece 102a at one side of the core 102 is inserted into a center hole of the bobbin 113 so that the bobbin 113 is secured on the core 102 and is immovable. The magnet 105 is interposed between the two core pieces 102a and 102b of the core 102 as shown in FIG. 13.

The rotational magnet 101 is rotatably supported by the base member (bottom board) 72 in a state having an shaft center line of the magnet directed toward a vertical direction perpendicular to a planar direction as shown in FIG. 10. Thus, a first bearing hole 115 is provided in the base member 72 so that the first shaft portion 106b of the first shaft member 106 located at one end of the rotational magnet 101, is rotatably fitted with the bearing hole. Moreover, a long hole 116 is provided in the base member 72 so that the drive pin 109 integrated with the rotational magnet 101 is pierced through to form the long hole. The long hole 116 is extended in a form of circular arc around the first bearing hole 115 as the center, and is configured such that a curvature radius of the circular arc is equal to a length from the first shaft portion 106b to the drive pin 109.

The second shaft member 107 located at the other end of the rotational magnet 101 is rotatably supported by a bearing bracket 121 that includes part of the base member (bottom board) 72. The bearing bracket 121 is formed into a crank shape, two places of which are bent at 90° in a lengthwise direction of reed-shaped plate material. A second bearing hole 122, with which the second shaft portion 107b of the second shaft member 107 is rotatably fitted, is provided in a flat surface portion 121a located at one side of the bearing bracket 121. Further, a through hole 123 to screw the bearing bracket 121 on the base member 72 and a positioning hole 124 to position the bearing bracket 121 at a prescribed position of the base member 72 are provided in a flat surface portion 121b of the other side of the bearing bracket 121.

A screw hole 117 is provided at a place corresponding to the through hole 123 of the bearing bracket 121 in the base member 72. Further, a positioning projection 118 is provided at a place corresponding to the positioning hole 124 of the beating bracket 121 in the base member 72. The positioning hole 124 is fitted with the positioning projection 118 and a shaft portion of a fixing screw 125 is inserted into the through hole 123 such that the screw shaft is tightly screwed in the screw hole 117. Thus, the bearing bracket 121 is tightly cramped the base member 72.

In addition, a support portion 131 to securely support the core 102 while positioning the core at a prescribed position is provided in the base member 72. A support groove 132 is provided in an upper surface of the support portion 131 to support the core 102 by engaging with the middle portion of the core. The middle part of the core 102 is engagedly supported by the support groove 132, and hence the present embodiment is configured such that the magnet 105 is interposed between the two core pieces 102a and 102b of the core 102 as shown in FIG. 13. The engineering plastic such as ABS and PC is suitable as a material of the base member 72, the bearing bracket 121, and the like.

Thus, in a case that the polarity of the core piece 102a located at one side of the core 102 is changed into the N-polarity and the polarity of the core piece 102b located at the other side is changed into the S-polarity by allowing to flow the electric current in the coil wire 114 of the coil 103 in a certain direction (for example, from one end 114a to the other end 114b) in a state shown in FIG. 13, the polarity of the core 102 changes to match the polarity of the magnet 105. Repulsion force is mutually generated between the polarities facing such that the rotational magnet 101 rotates to a clockwise direction (or, counterclockwise direction). As a result, the drive pin 109 provided in the first shaft member 106 is integrated with the magnet 105, rotates at the same angle as the magnet 105. The desired optical member such as the above-described fixed diaphragm and ND filter, for example, can rotate to move the optical member in and out of the optical path SL, or the shutter blade can be opened and closed, and the like by rotating of the drive pin 109.

FIG. 14 is a diagram showing an modified embodiment of the above-described core 102. In a core 135 of the embodiment, curved surfaces 136a and 136b are provided in inner surfaces of two core pieces 135a and 135b facing the magnet 105 to increase an area facing the magnet 105, and thus the intensity of generated magnetic force increases.

FIG. 15 is a diagram showing a second embodiment of the actuator device. An actuator device 140 of the embodiment includes a rotational magnet 141 which differs from the configuration of the actuator device 100. Therefore, the difference between the rotational magnet 141 and the rotational magnet 101 is mainly described; and duplicated explanations are omitted by giving the same reference numerals to the portions. The magnet 105 described here indicates the above-describe magnet 105.

A first shaft member 142 is integrally secured on one end of the magnet 105 in the axial direction. The first shaft member 142 includes a cylindrical column portion 142a having a concave portion 143 with which one end of the magnet 105 is engaged in the axial direction and an arm portion 142b protruding from an outer circumference of the cylindrical column portion 142a in a lateral direction (radius direction) intersecting with the axial direction. Further, the drive pin 109 protruding to the opposite side of a concave portion 144 is provided on a surface located at a top end of the arm portion 142b in the opposite surface of which an opening of the concave portion 144 is provided. Furthermore, a first bearing hole 145 piercing through in the axial direction is provided in the center of the cylindrical column portion 142a. The magnet 105 and the first shaft member 142 may be secured by press-fitting one end of the magnet 105 into the concave portion 144, and may also be secured such that the magnet and shaft member are bonded using the adhesives.

A second shaft member 143 includes a cylindrical column body having a concave portion 146 with which the other end of the axial direction of the magnet 105 is fitted. A second bearing hole 147 piercing through in the axial direction is provided in the center of the second shaft member 143. The magnet 105 and the second shaft member 143 may be secured by press-fitting the other end of the magnet 105 into the concave portion 146, and may also be secured such that the magnet and shaft member are boded using the adhesives.

A first shaft portion 148, which is rotatably fitted with the first bearing hole 145, is provided in the base member 72 such that the shaft portion 148 corresponds to the first bearing hole 145 of the first shaft member 142. Further, a second shaft portion 149, which is rotatably fitted with the second bearing hole 147, is provided in the flat surface portion 121a of the bearing bracket 121 such that the shaft portion 149 corresponds to the second bearing hole 147 of the second shaft member 143. The second shaft portion 149 is fitted with the second bearing hole 147 of the second shaft member 143 and the first shaft portion 148 is fitted with the first bearing hole 145 of the first shaft member 142. Thus, the rotational magnet 141 is rotatably supported by the base member 72 and the like. The other part of the configuration are similar to the above-described embodiment. Similar effects may be obtained with these configurations.

FIG. 16 and FIG. 17 are diagrams showing a third embodiment of the actuator device. An actuator device 150 of the embodiment includes a rotational magnet 151 and a structure of a bearing portion to support one end of the rotational magnet 151 in the axial direction which differ from the above-described actuator device 100. The difference between the rotational magnet 151 and the rotational magnet 101, and the bearing portion of the rotational magnet 151 are mainly described; and duplicated explanations are omitted by giving the same reference numerals. It should be noted that the magnet 105 and the first shaft member 106 in the embodiment are same as the above-described embodiment.

The first shaft member 106 is integrally secured on one end of the magnet 105 in the axial direction. In a state having no shaft member, the other end of the axial direction of the magnet 105 is rotatably supported directly by a bearing portion 151 provided in the bearing bracket 121. The bearing portion 151 includes a cylindrical body 151a provided on a surface of the bearing bracket 121 on the base member 72 and an axial direction projection 151b downwardly protruding inside the center of the cylindrical body 151a. In addition, a plurality of circumferential direction projections 152, 152 inwardly protruding in the radius direction are provided on a top end of the cylindrical body 151a. In this embodiment, the circumferential direction projections 152 are provided at three places such that the projections 152 having a prescribed length are located with a prescribed interval in the circumferential direction.

The three circumferential direction projections 152 are configured such that each projection 152 is not in contact with an edge portion 153 located at one side of the magnet 105; however, is in contact with a portion located inside of the magnet 105 in the axial direction, in a case where the magnet 105 is formed of a hard material having a high hardness. As described hereinbefore, suitable examples of materials of the magnet 105 in this embodiment include a neodymium compound and a samarium compound as a major component. However, the magnet 105 including these compounds formed by sintering increases in hardness. Thus, provided that the magnet rotates, if the edge portion is provided on the magnet 105, the bearing portion may be damaged by rotating movement of the edge portion and the bearing portion may rattle.

The above-described circumferential direction projection "that is not in contact with the edge portion 153 of the magnet 105 but in contact with the portion located inside of the axial direction" is prepared for controlling such rattles, and the like. Especially, since the actuator device is fairly small in the size of the actuator device for the optical device, the normal operation may not be inhibited due to particles or micro particles such as cutting dust and debris are produced by abrasion of the edge portion of the magnet 105. Accordingly, the above-described technology is effective. It should be noted that a reference numeral 154 in FIG. 17 denotes a bearing space portion provided inside of the bearing portion 151. A reference numeral 155 is a air-bleeding hole for divided metal mold provided to form the circumferential direction projection 152 of the bearing portion 151 by injection molding. However, after molding, the hole is used as a through-hole communicating the bearing space portion 154 with the outside. The and functions as an air hole to discharge the air.

Here, the axial direction projection 151b of the bearing portion 151 comes into contact with an end surface located at one side of the magnet 105 so that a movement of the magnet 105 in the axial direction is controlled by the axial direction projection 151b. However, since the axial direction projection 151b comes slidably in contact with the center of the end surface located at one side of the magnet 105 and a peripheral velocity of the center is significantly low, frictional resistance scarcely exist when the magnet 105 performs rotation. As a result, the particles such as cutting dust and debris are hardly produced by slidably contacting the axial direction projection 151b with the magnet 105, thereby steady rotational operation can be secured.

The diameter of the magnet for the rotational magnet is limited approximately 3 mm in the actuator device of related art; however, the diameter of the magnet can be reduced to in a range between 0.6 mm and 1.0 mm in the embodiment of the present invention. Major factors for the reduction of the diameter include:

(1) the neodymium compound and the samarium compound are used for the material of the magnet;

(2) the shaft portion is formed of the separate member which is bonded together thereafter.

In addition, the sintered magnet (neodymium magnet or samarium magnet) is generally difficult to mold into various shapes. It is preferable to process the magnet into the cylindrical column shape in view of cost (economy), accuracy, reliability, and the like.

The digital still camera 1 having such configuration can be used as follows. FIG. 1 shows a state in which an opening-closing spring of a lens barrier unit in the lens barrel 3 is closed so that the optical lens system is closed, which indicates the non-photography state. In this case, the power of the digital still camera 1 is off-state. Further, FIG. 2 shows a state in which the opening-closing spring of the lens barrier unit is opened so that the optical lens system is opened, which indicates the camera is ready to capture images. This state is automatically achieved by operating the power button 14 to turn on the power. As a result, the digital still camera 1 changes from a mode shown in FIG. 1 to a mode shown in FIG. 2.

Thereafter, the shutter button 15 is pressed with directing a photographic lens at a subject while the digital still camera 1 is ready to capture images, and thus, the subject can be imaged and the image of the subject can be captured. At this time, the optical zoom operation button 23 is operated so that a "WIDE" (wide angle) screen or a "TELE" (telephotographic) screen can be obtained by continuously changing a focal distance in line with a direction of this operation without changing a position of an image point.

The actuator device for the optical device according to the embodiment of the present invention can be reduced in size and a higher torque than the actuator device of related art can be obtained as described hereinbefore. As a result, a higher shutter speed can be achieved and optical portions such as the fixed diaphragm and the ND filer can move in and out of the optical path at a high speed.

An embodiment of the present invention is not limited to the embodiment described hereinbefore and shown in the attached drawings but various modifications and alterations are possible without deviating from the scope and spirit of the present invention. For instance, the application example of the digital still camera as the image-capture apparatus is described in the above-described embodiment; however, the embodiment of the present invention can also be applied to a digital image camera, a personal computer with built-in camera, a cellular phone with built-in camera, and other image-capture apparatuses. Furthermore, the example in which the three group lenses are used as the optical lens are described; however, it is obvious that the optical lens may be four lens group or more.

It should be understood by those skilled in the art that various modifications, combinations, sub-combinations and alterations may occur depending on design requirements and other factors insofar as they are within the scope of the appended claims or the equivalents thereof.

What is claimed is:

1. An actuator device for an optical device and adapted for mounting on a base member having a bearing hole and an elongated drive pin hole disposed apart from the bearing hole, the actuator device, comprising:
   a U-shaped core having a pair of parallel-extending core pieces interconnected to each other to form a U-shaped channel;
   a coil connected to and surrounding one of the pair of the parallel-extending core pieces;
   a cylindrically-shaped rotational magnet extending along and about a rotational axis extending in an axial direction; and
   a first shaft member fabricated as an integral construction and having a first shaft member surface and an opposite first shaft member surface, the first shaft member having a pivot portion extending about and radially from the rotational axis, an arm portion connected to and extending radially from the pivot portion, a first shaft portion extending radially about the rotational axis and connected to and extending from the first shaft member surface of the pivot portion and a drive pin connected to and extending from the first shaft member surface of the arm portion,
   wherein, the first shaft portion is sized to be rotatably received in the bearing hole and the rotational magnet is positioned within a cavity formed in the opposite first shaft member surface and is connected to the opposite first shaft member surface of the pivot portion in a manner that the rotational magnet and the first shaft portion are axially aligned in the axial direction to simultaneously pivot about the rotational axis while the drive pin is received in the elongated drive pin hole and operative to move arcuately therein when the rotational magnet and the first shaft portion pivot about the rotational axis, and
   wherein the rotational magnet is disposed in the U-shaped channel and spaced apart from the coil.

2. An actuator device for an optical device according to claim 1, further comprising:
   a second shaft member having a second shaft portion protruding in the axial direction of the rotational magnet is securely provided on the other end of the rotational magnet in the axial direction.

3. An actuator device for an optical device according to claim 1, wherein
   the rotational magnet includes a neodymium compound or samarium compound as a major component.

4. An image capture apparatus comprising:
   an image capture element attached to a lens barrel;
   a photographic optical system supported on the inside of the lens barrel to capture and project an image of a subject on the image capture element; and
   an actuator device moving an optical member in and out of an optical path;
   the actuator device mounted on a base member having a bearing hole and an elongated drive pin hole disposed apart from the bearing hole and including:
   a U-shaped core having a pair of parallel-extending core pieces interconnected to each other to form a U-shaped channel;
   a coil connected to and surrounding one of the pair of parallel-extending core pieces;
   a cylindrically-shaped rotational magnet extending centrally along and about a rotational axis extending in an axial direction; and
   a first shaft member fabricated as an integral construction and having a first shaft member surface and an opposite first shaft member surface, the first shaft member having a pivot portion extending about and radially from the rotational axis, an arm portion connected to and extending radially from the pivot portion, a first shaft portion connected to and extending from the first shaft member surface of the pivot portion and a drive pin connected to and extending from the first shaft member surface of the arm portion, wherein, the first shaft portion is sized to be rotatably received in the bearing hole and the rotational magnet is positioned within a cavity formed in the opposite first shaft member surface and is connected to the opposite first shaft member surface of the pivot portion in a manner that the rotational magnet and the first shaft portion are axially aligned along the axial direction to simultaneously pivot about the rotational axis while the drive pin is received in the elongated drive pin hole and operative to move arcuately therein when the rotational magnet and the first shaft portion pivot about the rotational axis, and wherein the rotational magnet is disposed in the U-shaped channel and spaced apart from the coil.

5. An actuator device for an optical device according to claim 1, wherein the U-shaped core is supported by the base member.

6. An actuator device for an optical device according to claim 5, further comprising a support portion having a first surface and an opposite second surface, the support portion connected to the base member at the first surface and having a groove formed into the second surface, the groove sized to receive and retain a portion of the U-shaped core therein.

* * * * *